United States Patent [19]

Nakama et al.

[11] Patent Number: 4,722,009

[45] Date of Patent: Jan. 26, 1988

[54] TONE RESTORING APPARATUS

[75] Inventors: Yasutoshi Nakama, Katano; Masayuki Misaki, Neyagawa; Seiichi Ishikawa, Hirakata, all of Japan

[73] Assignee: Matsushita Electric Industrial Co., Ltd., Osaka, Japan

[21] Appl. No.: 846,907

[22] Filed: Apr. 1, 1986

[30] Foreign Application Priority Data

Apr. 2, 1985 [JP] Japan .................................. 60-69445
Nov. 8, 1985 [JP] Japan .................................. 60-251403
Nov. 8, 1985 [JP] Japan .................................. 60-251406

[51] Int. Cl.$^4$ ............................................. G11B 5/00
[52] U.S. Cl. ........................................ 360/8; 360/32
[58] Field of Search ............... 369/174; 360/8, 32; 381/101, 102

[56] References Cited

U.S. PATENT DOCUMENTS

4,620,238 10/1986 Gaskell et al. ..................... 360/8

Primary Examiner—Vincent P. Canney
Attorney, Agent, or Firm—Spencer & Frank

[57] ABSTRACT

In a tone-restoring apparatus, a first and a second hold circuit latch at a period of 2T data signals read from a digital memory in response to a first and a second address supplied to the digital memory, and a first and a second multiplier circuit multiply the data signals latched in the first and second hold circuit by a monotonically increasing weighting function $W_1(x)$ $(0 \leq x \leq NT, 0 \leq W_1(x) \leq 1)$ or a monotonically increasing weighting function $W_2(x)$ $(0 \leq x \leq NT, 0 \leq W_2(x) \leq 1)$. An adder circuit adds the output signals from the first and second multiplier circuits to each other.

9 Claims, 13 Drawing Figures

TONE RESTORING APPARATUS

BACKGROUND OF THE INVENTION

This invention relates to a tone-restoring apparatus by which when a recorded audio signal is reproduced at twice the recording speed, the tone at the reproducing time is restored to the same tone as at the recording time.

Recently, it has become important to reproduce an audio signal at a different speed from the recording speed. If the audio signal is reproduced at twice the recording speed, the reproducing time can be halved and therefore the contents of the recording on a tape recorded by a tape recorder or VTR can be grasped in half the normal time. However, if the audio signal is merely reproduced at twice normal speed, the tone becomes high and thus difficult to bear and to distinguish speaking persons. Thus, it is desired to produce apparatus by which the recorded speech can be caught in a short time with the tone not changed upon high-speed reproduction. Such an apparatus is disclosed, for example, in an article titled "Tape recorder capable to timebase compression and expansion of conversation" NIKEI Electronics 1976. 7. 26.

A conventional tone restoring apparatus will be described with reference to the drawings.

Figure 9:
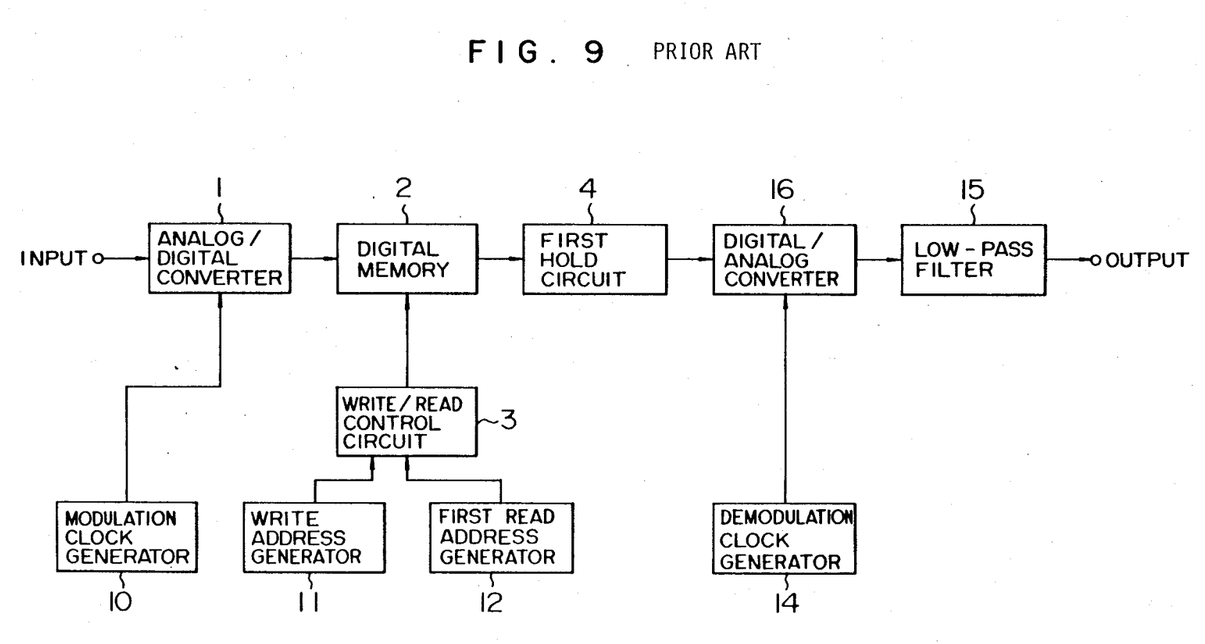
FIG. 9 is a block diagram of a conventional tone restoring apparatus.

FIG. 9 is a block diagram of a conventional tone restoring apparatus. Referring to FIG. 9, reference numeral 1 represents an analog-to-digital converter circuit for converting an input signal to a digital signal, 2 a digital memory for storing the digital signal, 3 a write/read control circuit for controlling the digital memory 2 to write and read, 4 a hold circuit for holding a read signal from the digital memory 2, 16 a digital-to-analog converter circuit for converting the digital signal from the hold circuit 4 to an analog signal, 10 a modulation clock generator circuit for actuating the analog-to-digital converter circuit 1, 11 a write address generator circuit for supplying a write address to the digital memory 2 via the write/read control circuit 3, 12 a read address generator circuit for supplying a read address to the digital memory 2 via the write/read control circuit 3, 14 a demodulation clock generator circuit for actuating the digital-to-analog converter circuit 16, and 15 a low-pass filter.

Figure 10:
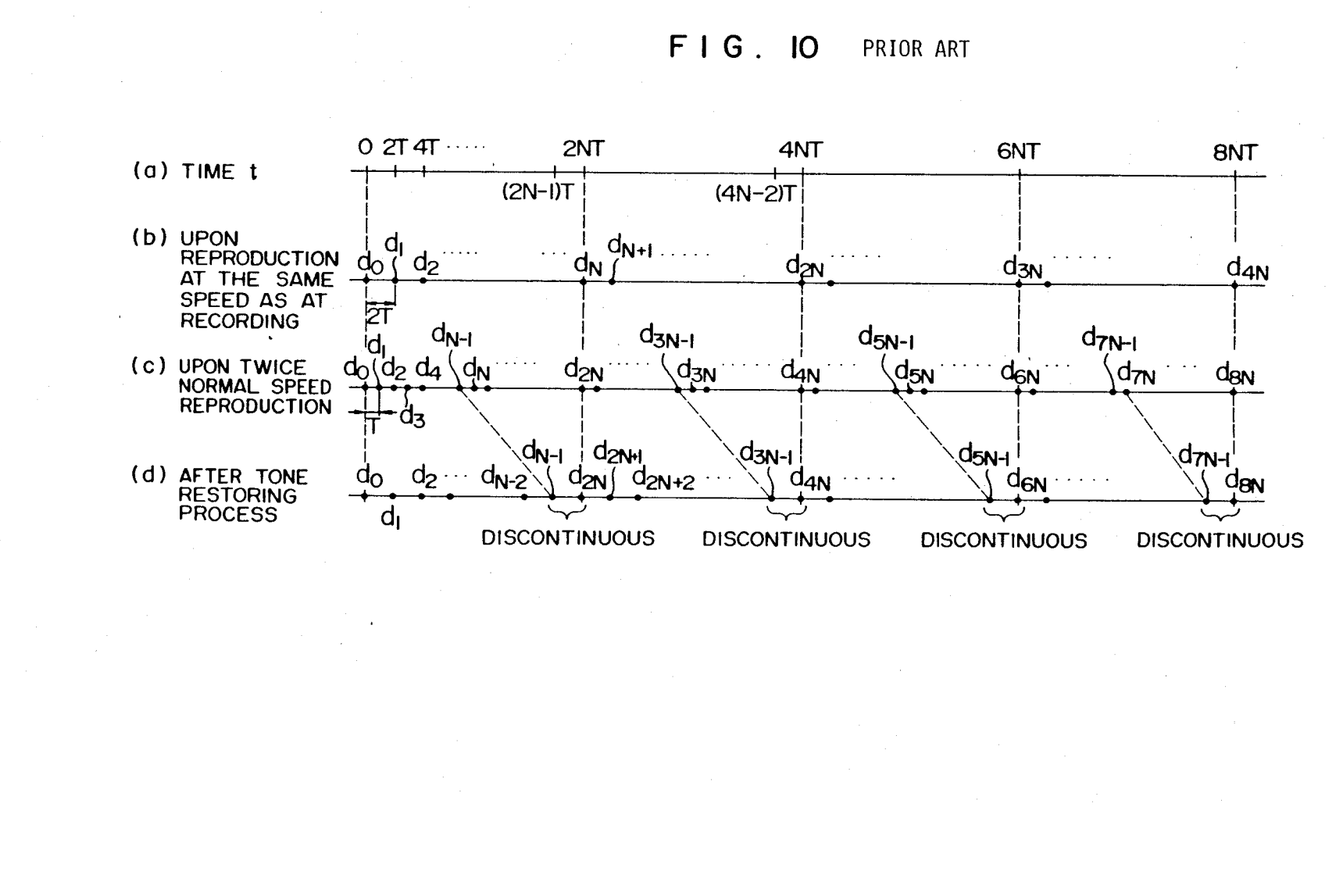
FIG. 10 consisting of a through d shows the principle of the conventional tone restoring apparatus.

The operation of this tone restoring apparatus will be described with reference to FIG. 10, which shows the principle thereof. It is assumed that when the reproduction is made at the same speed as at the recording, during the time t, $0 \leq t < 2NT$, N signals d0, d1, ..., dN−1 are reproduced at a period of 2T. At this time, 2N signals d0, d1 ..., d2N−1 are reproduced at twice normal speed during the time, t $0 \leq t < 2NT$. In order to restore this tone to the same pitch as at the recording time, the signals d0, d1, ..., dN−1 are reproduced during the time t, $0 \leq t < 2NT$ but the signals $d_N, d_{N+1}, \ldots, d_{2N-1}$ are not reproduced during that time, then signals $d_{2N}, d_{2N+1}, \ldots, d_{3N-1}$ are reproduced during the time t, $2NT \leq t < 4NT$, and so on.

Thus, the reproduced signal is restored to the original pitch at the recording time.

In the above method, however, the signals $d_{N-1}$ and $d_{2N}$ are discontinuous to each other and thus cause noise. In addition, the signals $d_N, d_{N+1}, \ldots, d_{2N-1}$ are not reproduced at all and therefore the information corresponding thereto is lost. If N is decreased to prevent continuous signals having long periods from being lost, the number of connection points per unit time increases resulting in an increase of noise.

Accordingly, it is an object of this invention to provide a tone restoring apparatus capable of reducing the loss of information and noise at connection points by using all the input signals and properly treating the discontinuous points.

SUMMARY OF THE INVENTION

According to this invention, there is provided a tone restoring apparatus comprising an analog-to-digital converter circuit for converting an input signal to a digital signal by sampling the input signal at a period of T satisfying a sampling rule and supplying the digital signal to a digital memory where it is stored, a write/read control circuit which is responsive to the input data generated from a write address generator circuit and first and second read address generator circuits to specify the write and read addresses of the digital memory and produce a write/read control signal, first and second hold circuits for latching at a period of 2T signals read from the digital memory in response to the first and second read addresses, first and second multiplier circuits for multiplying the signals latched in the first and second hold circuits by a monotonically increasing weighting function W1(X) ($0 \leq X \leq NT$, $0 \leq W1(X) \leq 1$) or a monotonically decreasing weighting function W2(X) ($0 \leq X \leq NT$, $0 \leq W2(X) \leq 1$), an amplitude control circuit for controlling the first and second multiplying circuits, an adder circuit for adding the output signals from the first and second multiplying circuits, and a digital-to-analog converter circuit for converting the output signal from the adder circuit to an analog signal.

The analog-to-digital converter circuit and the digital-to-analog converter circuit may be an adaptive delta modem for converting to or from a one-bit digital signal.

According to the tone restoring apparatus of this invention, 2N signals d0, d1, d2, ..., $d_{2N-1}$ are stored in the digital memory at a period of T from a reference time t=0, the N signals d0, d1, d2, ..., $d_{N-1}$ are read from the memory and latched in the first hold circuit, at a period of 2T during the time t, $0 \leq t < 2NT$, the N signals $d_N, d_{N+1}, d_{N+2}, \ldots, d_{2N-1}$ are read from the memory and latched in the second hold circuit at a period of 2T during the time t, $NT \leq t < 3NT$, the output signal from the first hold circuit is multiplied in the first multiplier circuit by W1(t) during the time t, $0 \leq t \leq N$ and W2(t−NT) during the time t, $NT \leq t < 2NT$, the output signal from the second hold circuit is multiplied in the second multiplier circuit by w2(t) during the time t, $0 \leq t \leq NT$ and W1(t−NT) during the time t, $NT \leq t \leq 2NT$, and the writing, reading, and amplitude control operations are repeated at a period of 2T, thereby restoring the tone at twice normal speed to the original pitch.

BRIEF DESCRIPTION OF THE DRAWINGS

The invention will become more readily understood from the following exemplary description taken with the accompanying drawings, wherein.

DESCRIPTION OF THE PREFERRED EMBODIMENT

One embodiment of this invention will be described with reference to the drawings.

Figure 1:
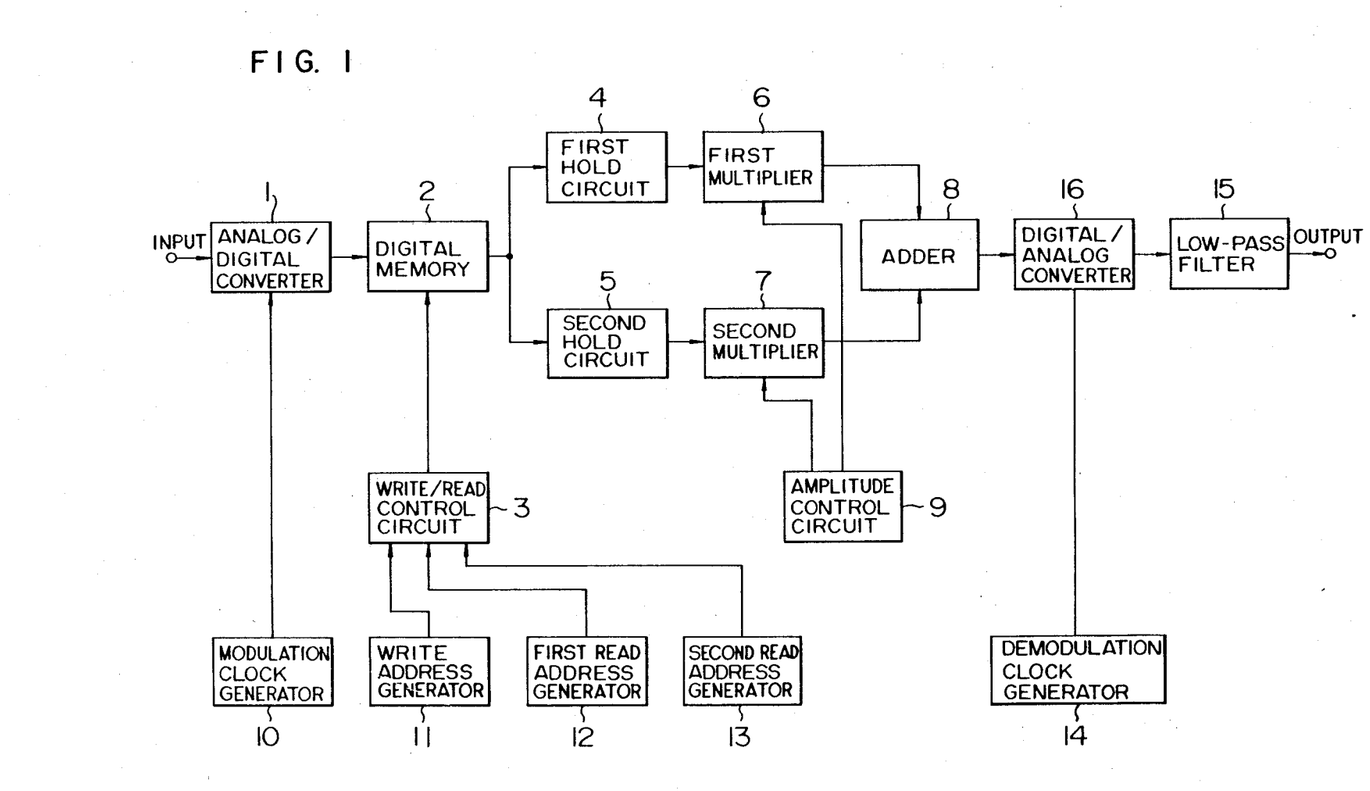
FIG. 1 is a block diagram of one embodiment of a tone restoring apparatus of this invention.

FIG. 1 is a block diagram of one embodiment of a tone-restoring apparatus of the invention.

Referring to FIG. 1, there is shown an analog-to-digital converter circuit 1 which is responsive to a clock from a modulation clock generator circuit 10 to sample an input signal at a period T satisfying a sampling rule, thereby converting it to a digital signal and to supply the digital signal to a digital memory (RAM) 2 where the digital signal is stored. Shown at 3 is a write/read control circuit which is responsive to address data from a write address generator circuit 11 and first and second read address generator circuits 12 and 13 to produce a write/read control signal for specifying a write/read address to the digital memory 2 and for controlling the memory to write and read. Shown at 4 and 5 are first and second hold circuits for latching at a period of 2T signals read from the digital memory 2 in response to the first and second read addresses, and 6 and 7 are first and second multiplier circuits for multiplying the signals latched in the first and second hold circuits 4 and 5 by a monotonically increasing weighting function W1(x), ($0 \leq x \leq NT$, $0 \leq W1(x) \leq 1$) and a monotonically decreasing weighting function W2(x), ($0 \leq x \leq NT$, $0 \leq W2(x) \leq 1$). Shown at 8 is an adder circuit for adding the output signals from the first and second multiplier circuits 6 and 7, and 9 is an amplitude control circuit for controlling the first and second multiplier circuits 6 and 7. From a reference time t=0, 2N signals d0, d1, d2, . . ., $d_{2N-1}$ are stored at a period of T in the digital memory 2, and the N signals d0, d1, d2, . . ., $d_{N-1}$ are read from the digital memory 2 and latched in the first hold circuit 4 at period of 2T during a time, $0 \leq t < 2NT$. The N signals $d_N$, $d_{N+1}$, $d_{N+2}$, . . ., $d_{2N-1}$ are read from the digital memory 2 and latched in the second hold circuit 5 at period of 2T during the interval $NT \leq t < 3NT$. At the first multiplier circuit 6, the output signal from the first hold circuit 4 is multiplied by W1(t) during the period of time t, $0 \leq t \leq NT$ and by W2(t−NT) during the period of time t, $NT \leq t \leq 2NT$. At the second multiplier circuit 7, the output from the second hold circuit 5 is multiplied by W2(t) during the period of time t, $0 \leq t \leq NT$ and by W1(t−NT) during the period of time t, $NT \leq t \leq 2NT$. Shown at 16 is a digital-to-analog converter circuit for converting the output signal from the adder circuit 8 to an analog signal. In each of the figures, like elements corresponding to those of FIG. 1 are identified by the same reference numerals.

The principle of this invention will be described with reference to FIG. 3.

Figure 3:
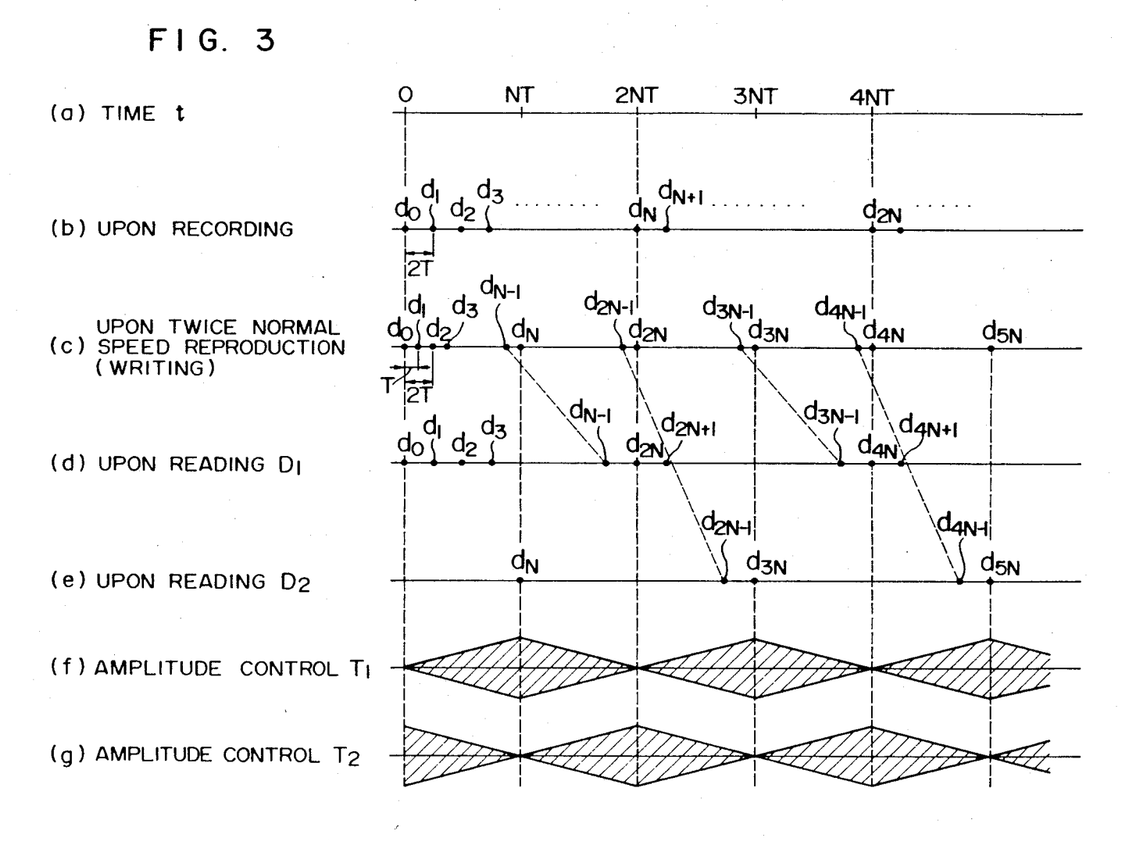
FIG. 3 consisting of a through g shows the principle of the tone restoration according to this invention.

FIG. 3 is a diagram useful for explaining the principle of this invention. In a twice normal speed reproduction mode, the 2N signals d0, d1, . . ., $d_{2N-1}$ are supplied during the period of time t, $0 \leq t < 2NT$, to the digital memory 2 where they are written. At this time, during the time t, $0 \leq t < 2NT$ the signals d0, d1, . . ., $d_{N-1}$ are read in response to the address from the first read address generator circuit 12 and latched in the first hold circuit 4, and during the period of time, $NT \leq t < 3NT$ the signals $d_N$, $d_{N+1}$, . . ., $d_{2N-1}$ which were not used in the prior art are read in response to the address from the second read address generator circuit 13 and latched in the second hold circuit 5. The two signals latched in the first and second hold circuit 4 and 5, since having discontinuous points, are modified by the amplitude control T1, T2 to avoid the influence of the discontinuous points on the signals. In other words, the signals latched in the first hold circuits 4 and 5 are linearly amplitude-modulated in synchronism with the period of the discontinuous points by the amplitude control T1, T2 shown in FIG. 3f and FIG. 3g, respectively. This amplitude-modulation is made in the following way. For amplitude control T1, T2 the outputs from the first and second hold circuits are multiplied by the multiplying coefficients in the first and second multiplier circuits 6 and 7 which coefficients are changed from 0 to 1 by the amplitude control circuit 9. Alternatively, the one-bit adaptive digital-to-analog converter circuit 16 may be controlled by the amplitude control circuit 9, making the amplitude control T1, T2. Thus, the two read signals are added in the adder circuit 8 and the output therefrom is processed to produce tone-restored sound with little loss of information and little connection-point noise.

The operation of the tone restoring apparatus will be described below.

Figure 4A:
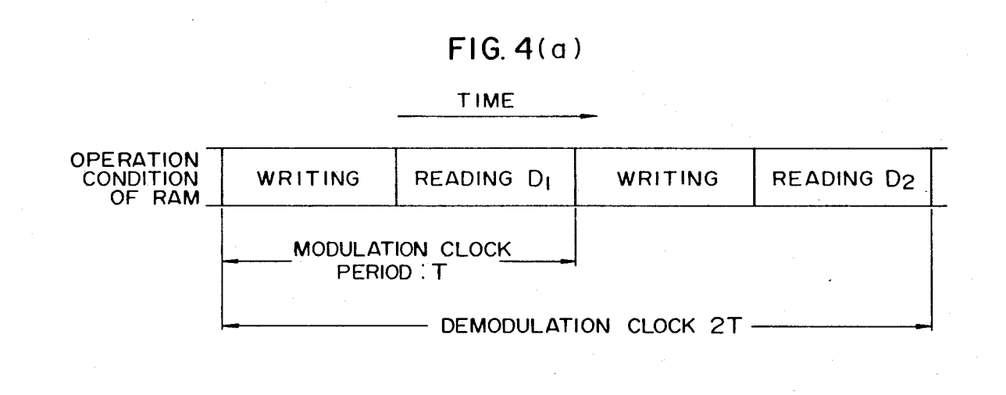
FIG. 4 consisting of 4(a) and 4(b) is a timing chart of the operation of the digital memory in one embodiment of this invention.
Figure 4B:
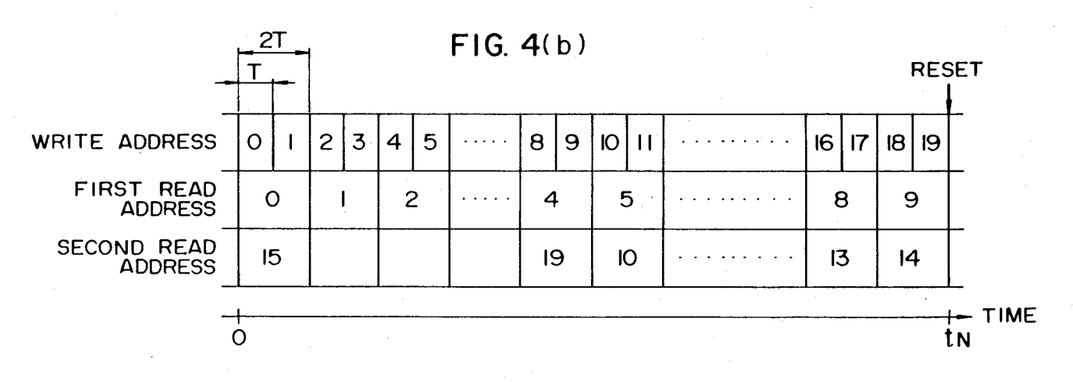

The analog-to-digital converter circuit 1 converts the input signal to a digital signal by sampling it at period T which satisfies the sampling rule. The digital signal therefrom is stored in the digital memory 2 (hereinafter, referred to as the RAM) at the timing shown in FIG. 4(a) under the control of the write/read control circuit 3. The write address and read addresses to the digital memory 2 are reset at constant intervals of time as, for example, shown in FIG. 4(b), these write address and read addresses are generated from the write address generator circuit 11 and the first and second read address generators 12 and 13 and fed through the write/read control circuit 3 to the digital memory 2 at the timing shown in FIG. 4(a). The first hold circuit 4 holds the signal read at the read time of D1 for a time interval 2T and the second hold circuit 5 holds the signal read at the read a time interval of D2 for time 2T as shown in FIG. 4(a). The first multiplier circuit 6 multiplies the output from the hold circuit 4 by the coefficient changed by the amplitude control circuit 9 as shown in FIG. 3(f). The second multiplier circuit 7 similarly multiplies the output from the hold circuit 5 by the coefficient changed by the amplitude control circuit 9 as shown in FIG. 3(g). The adder circuit 8 adds the output from the first multiplier circuit 6 and the output from the second multiplier circuit 7. The output of the adder circuit 8 is fed to the digital-to-analog converter circuit 16 where it is converted to an analog signal, which is then fed through the low-pass filter 15 to the output terminal. FIG. 4 is a timing chart for the operation of each portion in this embodiment.

According to this embodiment as mentioned above, since the signals stored at different times are read in unit time as shown in FIG. 4, controlled in their amplitudes and added, the tone-restored speech information has no loss and little noise at connection points.

While in this embodiment the digital signals are amplitude-controlled, the analog signals after digital-to-analog conversion may be amplitude-controlled and then added.

Figure 2:
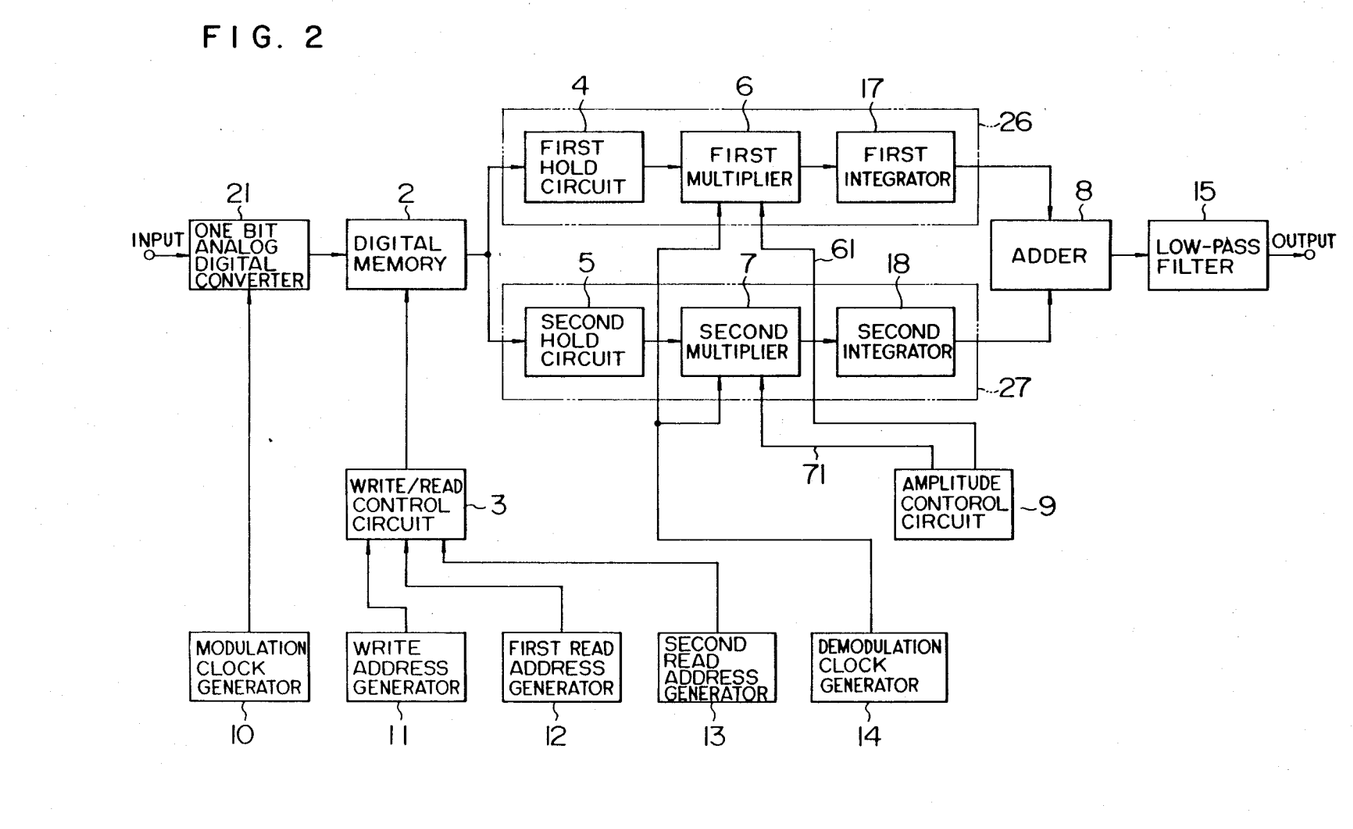
FIG. 2 is a block diagram of another embodiment of a tone restoring apparatus of this invention.

Another embodiment of this invention will be described with reference to the drawings. FIG. 2 is a block diagram of a second embodiment of this invention.

In this embodiment, like elements corresponding to those in FIG. 1 are identified by the same reference numerals. The arrangement of this embodiment is different from that of FIG. 1 in that an ADM system is used for the analog-to-digital conversion. Referring to FIG. 2, 21 represents a one-bit adaptive analog-to-digital converter circuit, 26 and 27 one-bit adaptive digital-to-analog converter circuits, 8 the adder circuit for analog signals, and 9 the amplitude control circuit for changing the signal amplitude by controlling the quantization width of the one-bit adaptive analog-to-digital converter circuit 26, 27. The ADM system for the change of amplitude is disclosed in Japanese Patent Application No. 245141/1984.

Figure 5:
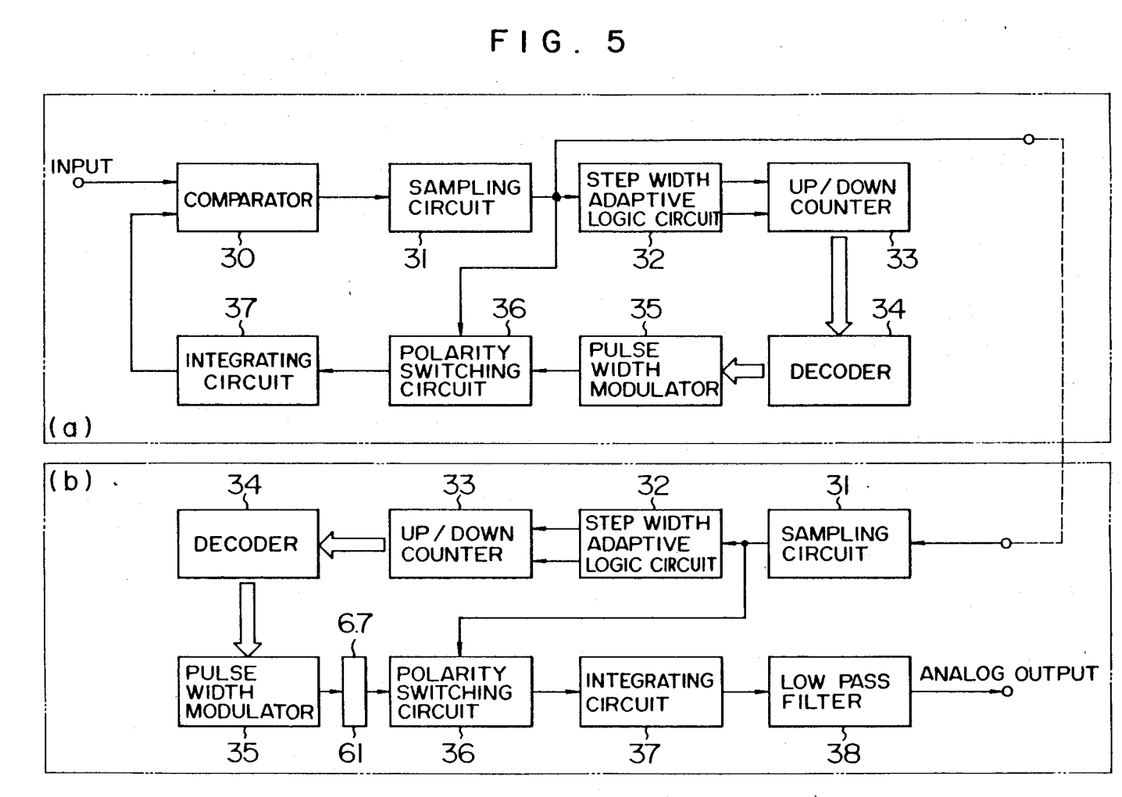
FIG. 5 is a block diagram of the analog-to-digital converter circuit used in this invention.
Figure 6:
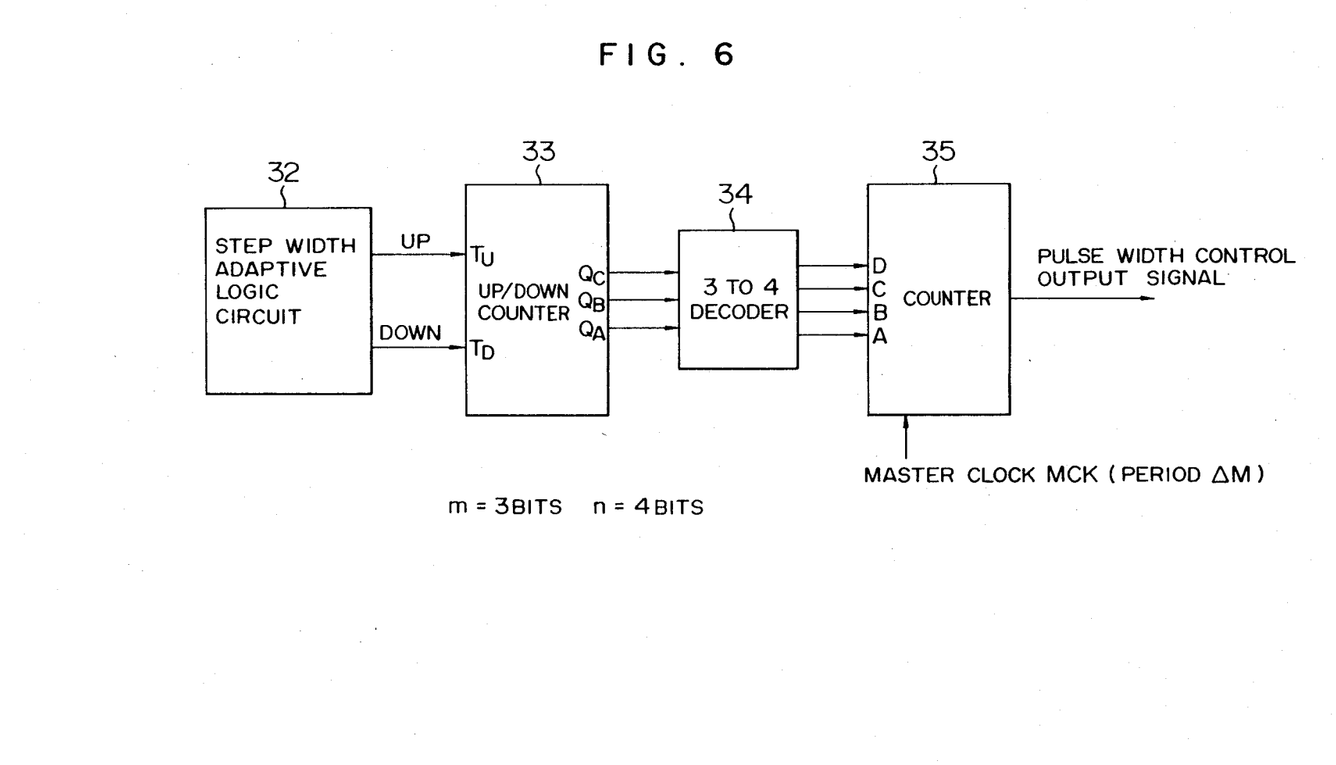
FIG. 6 is a block diagram useful for explaining the main operation of the analog-to-digital converter circuit of the invention.

This one-bit analog-to-digital converter circuit, which is used in the second embodiment, is formed by an adaptive delta modulator-demodulator as shown in FIG. 5. This will be described.

In FIG. 5, block (a) shows an adaptive delta modulator. 30 represents a comparator, 31 a sampling circuit which produces a digital signal of one bit at each sampling clock, 32 a step width adaptive logic circuit having an algorithm for determining the quantization step width, and 33 an up/down counter which produces a count of m bits in response to an input signal. 34 denotes a decoder for converting a signal of m bits to n bits, 35 a pulse-width modulator circuit which produces a pulse width proportional to an output signal of n bits from the decoder 34, 36 a polarity switching circuit for switching between negative and positive polarities in response to the output of "1", "0" from the sampling circuit, and 37 an integrating circuit for integrating the output from the polarity switching circuit 36, thereby converting it to an analog signal.

Similarly, block (b) shows an adaptive delta demodulator. In FIG. 5, the like elements are identified by the same reference numerals. Thus, an analog output can be produced by passing the output of the integrating circuit 37 through a low-pass filter 38.

The principle of operation of this invention will be described with reference to FIG. 5. When the step width is increased or decreased, an up- or down-count signal is supplied to the up/down counter 33, controlling it to count up or down, respectively. The up/down counter 33 is assumed to produce an output of m=3 bits, and the decoder 34 to produce an output of n=4 bits. The up/down counter 33 produces any one of the 8 different outputs (000, 001, ..., 111). The decoder 34 is not necessary when the pulse width of the output signal is linearly changed for eight different signals. However, in order to decrease noise when there is no signal, and to decrease overload noise at high frequency or at large input, it is nonlinearly changed by the decoder 34 because linear change is not enough. Thus, the decoder 34 is used for nonlinear conversion. The counter out of 3 bits is converted nonlinearly to 4 bits ($2^4 = 16$ combinations) as shown on the following table.

TABLE

| Counter output of 3 bits | Counter output of 4 bits |
|---|---|
| 111 | 1111 |
| 110 | 1011 |
| 101 | 0111 |
| 100 | 0101 |
| 011 | 0011 |
| 010 | 0010 |
| 001 | 0001 |
| 000 | 0000 |
| ↑ MSB | ↑ MSB |

The 3-bit and 4-bit values on the table correspond to decimal numbers 0, 1, 2, 3, 5, 7, 11 and 15. The output from the decoder 34 can be converted to pulse width by a counter. In this case, although a 4-bit counter is used, it is possible to produce a pulse width corresponding to the count of a master clock.

For example, if the master clock MCK is of 4.00 MHz ($\Delta M = 0.25$ μsec) and the sampling clock to the modem is of 250 KHz ($\Delta T = 4$ μsec), the $\Delta T/\Delta M$ is 16 (count) maximum within one period. At this time, all is "1" within one period (4 μsec) and the pulse width becomes maximum. Similarly, Count 12→3 μsec
Count 8→2 μsec
Count 6→1.5 μsec
Count 4→1 μsec
Count 3→0.75 μsec
Count 2→0.5 μsec
Count 1→0.25 μsec This pulse width may be in any position within one period as for example in FIGS. 7(b) and 8(b). The pulse output is produced at each period and fed via the polarity switching circuit 36 to the integrating circuit 37, which then produces an analog signal. For the reduction of quantization noise and overload noise, it is necessary to increase the number of bits of the up/down counter 33 and that of the counter 34.

The multiplication system will be described.

Figure 7A:
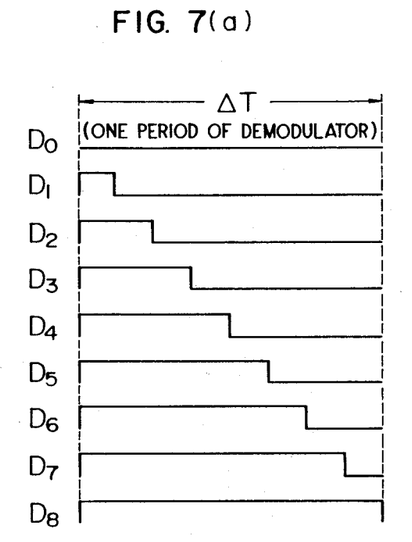
FIGS. 7a and b and 8a and b are waveform diagrams useful for explaining the operation of the multiplier circuit in this invention.
Figure 7B:
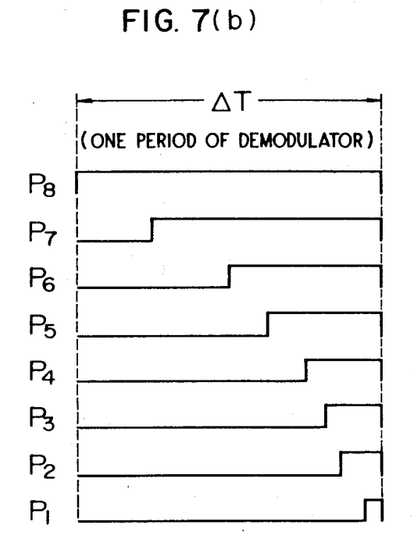
Figure 8A:
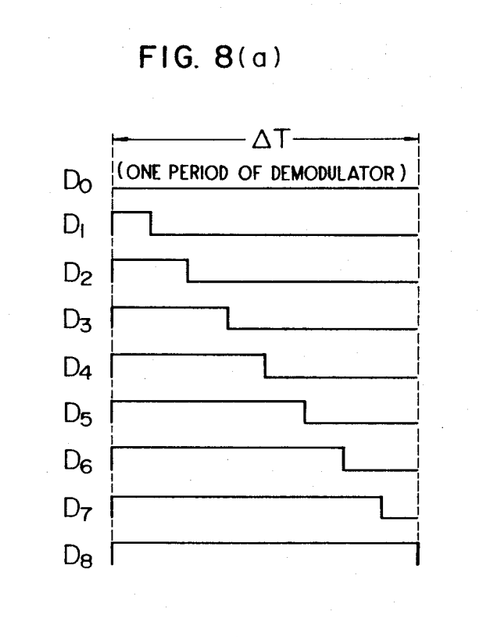
Figure 8B:
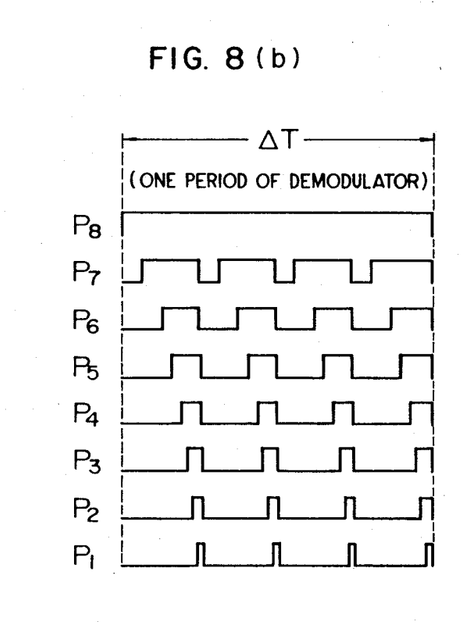

The amplitude control circuit 9 produces a signal of the pulse width shown in FIGS. 7(a) and 8(a) (the same) and which changes in the period of 0 to NT as shown in FIGS. 3(f) and 3(g). If, now, the output from the pulse-width modulating circuit 35 is as shown by P7 in FIG. 7(b), and the output from the amplitude control circuit 9 by D2, then P7×D2 is zero and thus the signal P7 cannot be reduced to ¼. The same phenomenon will occur in the multiplication at other conditions. Thus, in this embodiment, the pulse-width modulating circuit 35 produces a pulse which is distributed in terms of time as shown in FIG. 8(b) in order to make the multiplication described above. Thus, in the P7×D2, only the first crest is "1", and the other three crests are "0", resulting in ¼ output waveform. The multiplication of digital waveforms can be made by an AND gate circuit.

According to this embodiment, since the analog-to-digital conversion system is formed of an adaptive delta modem which is small in circuit scale and includes many gate circuits, the tone-restoring apparatus can be produced at low cost.

According to this invention, since the apparatus comprises the second read address generator circuit, the second hold circuit, the first and second multiplier circuits, the adder circuit and the amplitude control circuit, it can achieve tone restoring using a signal which was not used in the prior art. Therefore, the tone restored signal has no loss of information and less noise at connection points because the amplitude was controlled.

What is claimed is:

1. A tone-restoring apparatus comprising:
    an analog-to-digital converter circuit for converting an input signal to a digital signal by sampling said input signal at a period satisfying a sampling rule, and supplying said digital signal to a digital memory in which said digital signal is stored;
    a write/read control circuit for producing a write/read control signal to specify a write/read address to said digital memory and to control said digital memory to write and read in response to input address data generated from a write address generator and first and second read address generator circuits;
    first and second hold circuits for latching at a period of 2T signals read from said digital memory in response to first and second read addresses to said digital memory;
    first and second multiplier circuits for multiplying said signals latched in said first and second hold circuits by a monotonically increasing weighting function $W_1(x)$ ($0 \leq x \leq NT$, $0 \leq W_1(x) \leq 1$) or a monotonically decreasing weighting function $W_2(x)$ ($0 \leq x \leq NT$, $0 \leq W_2(x) \leq 1$);
    an adder circuit for adding the output signals from said first and second multiplier circuits; and
    a digital-to-analog converter circuit for converting the output signal from said adder circuit to an analog signal.

2. A tone-restoring apparatus according to claim 1, wherein 2N signals $d_0, d_1, d_2, \ldots, d_{2N-1}$ are stored in said digital memory at a period of T from a reference time $t=0$, the N signals $d_0, d_1, d_2, \ldots, d_{N-1}$ are read from said digital memory and held in said first hold circuit at a period of 2T during a time $t$, $0 \leq t < 2NT$, the N signals $d_N, d_{N+1}, d_{N+2}, \ldots, d_{2N-1}$ are read from said digital memory and held in said second hold circuit at a period of 2T during $NT \leq t < 3NT$, the output signal from said first hold circuit is multiplied by $W_1(t)$ during the time $t$, $0 \leq t \leq NT$ and $W_2(t-NT)$ during the time $t$, $NT \leq t \leq 2NT$ in said first multiplier circuit, and the output from said second hold circuit is multiplied by $W_2(t)$ during the time $t$, $0 \leq t \leq NT$ and $W_1(t-NT)$ during the period $t$, $NT \leq t \leq 2NT$ in said second multiplier circuit, the multiplying coefficients of said multipliers being controlled by an amplitude control circuit, said writing, reading and amplitude control being repeated at a period of 2NT.

3. A tone-restoring apparatus according to claim 1, wherein an adaptive delta modulation system is used for the analog-to-digital conversion, and the amplitude control is made by a one-bit adaptive digital-to-analog converter circuit.

4. A tone-restoring apparatus according to claim 1, wherein an adaptive delta modulation system is used for the analog-to-digital conversion, this modulation system using a delta modulator having a compression-and-expansion circuit that changes the output of an integrator by increasing the quantization step width when a plurality of the delta modulated digital data of one bit, "1" or "0" occur in sequence, and the adaptive quantization step width is determined by a pulse width modulator circuit in the delta modulator.

5. A tone-restoring apparatus according to claim 4, wherein said pulse width modulator circuit employs a linear pulse-width modulator circuit for linearly converting the pulse count to a pulse width.

6. A tone-restoring apparatus according to claim 4, wherein said pulse width modulator circuit employs a nonlinear pulse-width modulator circuit for nonlinearly converting the pulse count to a pulse width.

7. A tone-restoring apparatus according to claim 4, wherein the multiplier and multiplicand in said first and second multiplier circuits are both a pulse-width modulated signal.

8. An adaptive delta modem according to claim 3, wherein said adaptive delta modulator comprises:
    a comparator for comparing an analog input signal with a fed-back signal;
    a sampling circuit for producing a digital signal of one bit;
    a quantization step width adaptive logic circuit;
    an m-bit up/down counter;
    a decoder for decoding an m-bit output to n bits;
    a pulse width modulator circuit for converting an n-bit output from said decoder to a pulse width;
    a polarity switching circuit for switching the output from said pulse-width modulating circuit between positive and negative polarities; and
    an integrator circuit for integrating the output from said polarity switching circuit, thereby converting it to an analog signal, and producing said fed-back signal, said adaptive delta demodulator comprises the same components as those of said adaptive delta modulator except said comparator, and a low pass filter at the output of said integrator circuit.

9. An adpative delta modem according to claim 8, wherein a pulse-width modulator circuit for converting the output from said m-bit up/down counter to a pulse width is used instead of said decoder for converting an m-bit output to n bits.

* * * * *